Dec. 17, 1957      W. F. MIRON      2,816,588

CUTTING BOARD FOR SLICING VARIOUS FOOD PRODUCTS

Filed Feb. 9, 1955

INVENTOR.
BY WALTER F. MIRON
ATTORNEY

United States Patent Office 2,816,588
Patented Dec. 17, 1957

2,816,588

CUTTING BOARD FOR SLICING VARIOUS FOOD PRODUCTS

Walter Francis Miron, Detroit, Mich.

Application February 9, 1955, Serial No. 487,032

1 Claim. (Cl. 146—215)

The present invention relates to cutting devices for food products, and more particularly a cutting board for slicing various food products into slices of predetermined thickness.

One object, is to provide a slicing board having cavities in one face thereof of a predetermined depth to receive the end of a food product in such a manner that the surface of the board will guide the knife or other cutting instrument and permit a slice to be taken of a thickness equal to the depth of the cavity.

Another object, is to provide a slicing device for domestic use which can be quickly and easily employed for cutting slices of various food products such as cheese, meats, bread and the like which are in loaf form and which heretofore have been extremely difficult to cut into slices of uniform thickness.

Another object, is to provide a slicing device for food products and the like which will prevent the knife used for cutting the food product from becoming dull. In cutting food products at present, the same is held on a support while the knife is moved downwardly so that the edge of the knife engages the support and is dulled. The present invention enables the cutting knife to be used such that the edge is sharpened on a metal rim extending around the perimeter of each cavity in the cutting block or device.

Another object, is to provide a slicing device which is adapted to cut food products into slices of uniform thickness by the use of a hand knife, and in which the cut slices are adapted to be easily removed by sliding the food product through the entrance portion of the cavity, while at the same time lifting the uncut food product clear of the cutting device.

Another object, is to provide a slicing and cutting device having a holder for frictionally engaging the upper surface of a food product to hold the same in the cavity of the cutting board while a slice is being taken with a hand knife. The holding device is so shaped as to enable the same to be used in the removal of the slice from one of the cavities after the food product has been cut.

Another object, is to provide a metal rim extending around the perimeter of the food product receiving cavity of the cutting board which is adapted to engage and guide a knife, which when angled slightly from the horizontal will present the cutting edge in position for being sharpened by the metal rim.

Other objects and advantages of the invention will become apparent during the course of the following description of the accompanying drawing, wherein.

Figure 5:
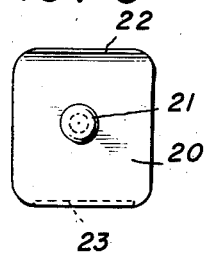
Figure 6:
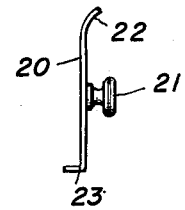
Figure 4:
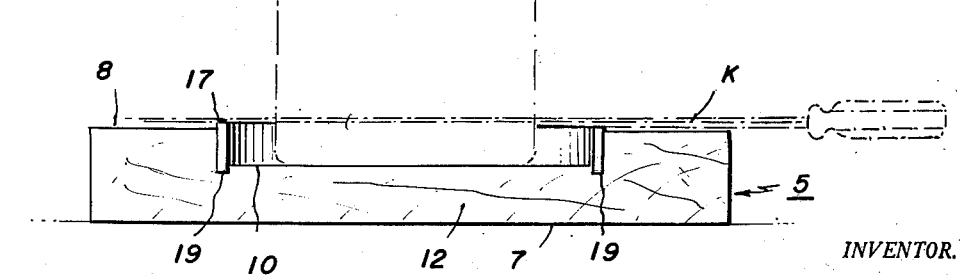
Figure 4 is an enlarged end elevational view of the slicing board showing the manner in which a food product loaf is held therein with one end received in the cavity at one end of the board, while taking a slice with a knife or other hand tool.

Figure 5 is a top elevational view showing the holder illustrated in Figure 4 to enable pressure to be applied to the food product while the same is held in one of the cavities in the slicing board during the slicing operation, and Figure 6 is an end elevational view of the holder showing the manner in which the edges are shaped to engage the food product and permit the same to be held in place during the slicing operation.

In the drawing, and more in detail, there is shown in Figures 1 to 4 inclusive, a cutting device including a rectangular member generally designated 5 which includes a body portion 6 formed of wood, metal or a synthetic plastic composition. One side of the board is plain as at 7 (Figure 3), and the top side or surface 8 is provided with a pair of cavities 9 and 10. The cavity 9 is of a depth approximately one-eighth inch or three-sixteenths inch deep, while the cavity 10 is of a depth approximately one-quarter inch deep.

It is intended to employ the cavity 9 when slicing food products such as loaf meat and the like for sandwiches and to employ the other cavity for slicing other products such as bread, vegetables or various meats for cooking. Each of the cavities 9 and 10 have entrance openings adjacent the end portions 12 of the slicing board 5, and the inner portions of the cavities are separated by a transverse wall 13 having curved portions 15. Thus, food products of various shapes and sizes can be placed in the cavities 9 and 10 while being sliced.

Figure 2:
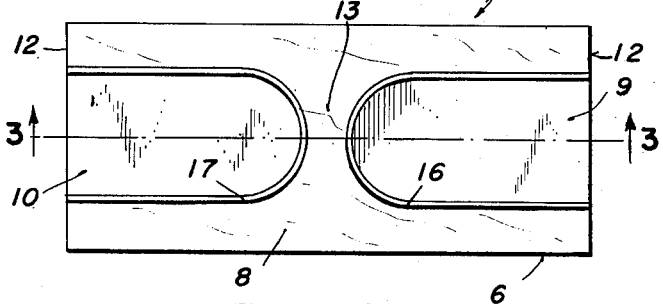
Figure 2 is a top elevational view showing the manner in which the knife engaging and sharpening rim is positioned around the edge of the cavities.
Figure 3:
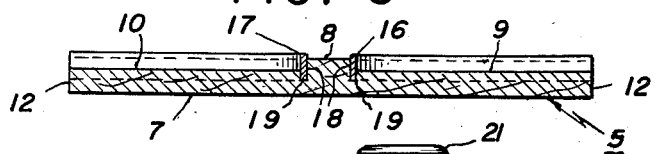
Figure 3 is a longitudinal cross-sectional view taken on line 3—3 of Figure 2, and looking in the direction of the arrows to further illustrate the manner in which the knife sharpening rims are secured in place.

In Figures 2, 3 and 4, the cutting device is slightly modified by the use of metal strips 16 and 17 arranged within the cavities adjacent the vertical walls 18 thereof. The metal strips 16 and 17 are anchored in place by being received in restricted recesses 19 of the cavities 9 and 10. The metal strips 16 and 17 extend slightly above the top surface 8 of the slicing board and are arranged to engage one side of a knife blade of a hand knife K (Figure 4) when cutting a food product as indicated in dotted lines and designated M in Fig. 4.

Figure 1:
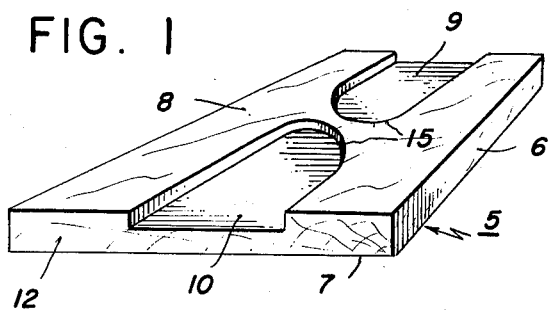
Figure 1 is a perspective view of the slicing board embodying the present invention and showing the manner in which a pair of food product receiving cavities of predetermined depth are formed for the purpose of cutting or slicing food products uniformly of predetermined thickness.

When the food product M is being cut by a knife K the side edge of the knife engages the upper edge of one of the metal strips 16 and 17 such as to produce a sharpening action on the knife. When the knife K is used for cutting food products in a slicing device as shown in Figure 1, the knife is guided by the top surface 8.

In order to hold the food product in place during the slicing operation, a plate-like holder 20 is provided and is adapted to engage the upper surface of the food product M. A handle 21 is secured to the plate 20 to enable the same to be manually manipulated, and one edge of the plate is curved upwardly as at 22 while an opposite edge 23 (Figure 6) is angularly bent to form a food product engaging portion to prevent the plate 20 from slipping while the same is employed for holding a food product of the loaf type M in place in the cavity 10 while a slice is being cut with a knife K.

In operation, a food product such as meat, cheese, bread, vegetables or the like may be placed endwise in one of the cavities 9 or 10 depending, of course, upon the thickness of slice desired and the food product being sliced. While the food product is held in place a knife is used for cutting a slice such that the flat side of the knife engages the upper surface 8 on the cutting board 5. After a slice has been cut the knife is used for sliding the slice endwise toward the open end of the cavity. A plate or the like may be placed adjacent the board for receiving the cut slices.

In operation of the form of the invention shown in Figures 2 to 6 inclusive, the flat face of the knife K is held at an acute angle to the horizontal while taking a slice from a food product M held in one of the recesses 9 or 10 by the holder plate 20, the knife engages the upper edge of one of the strips 16 or 17 and is thereby sharpened.

When using the holder 20, and after the major portion of the food product has been sliced, the holder 20 can be used to cut the last slice from the heel by presenting the knife to the underside of the upturned end 22, while the other end or angular portion 23 is in gripping engagement with the heel. By employing the slicing board and holding plate 20, food products may be sliced quickly and easily into uniform slices of predetermined thickness until the entire food product has been sliced. This eliminates ends or heels of food products which are difficult to hold while being sliced, and are generally discarded when cut in the conventional manner.

It is to be understood that the forms of the invention herewith shown and described are to be taken as preferred embodiments thereof, and that various changes in the shape, size and arrangement of parts may be resorted to without departing from the spirit of the invention or the scope of the subjoined claim.

What I claim is:

In a domestic slicing device for cutting bulk food products and holding the same in position while being sliced, a substantially flat board-like member having a pair of recessed cavities formed in the upper surface thereof and extending inwardly from opposed side edges of said board-like member, said recessed cavities being provided at their innermost portions with curved vertical walls connecting straight vertical walls extending inwardly from said opposed side edges, the bottom walls of said recessed cavities being flat and lying in a plane spaced from and parallel to the plane of said upper surface and with the plane of one of said bottom walls being of a greater distance from the plane of said upper surface than the bottom wall of another of said cavities, and a metal strip extending along the curved and straight wall portions of said recessed cavities with the upper edge thereof projecting a slight distance above the plane of said upper surface to support a cutting implement and to hold said cutting implement in slightly spaced relation from said upper surface and produce a sharpening action on said cutting implement when the same is moved across said cavity during the cutting operation, said recessed cavities being adapted to receive and hold food products of round section arranged on end with the curved portion of the food product engaging the curved inner walls of said recessed cavities.

References Cited in the file of this patent

UNITED STATES PATENTS

| | | |
|---|---|---|
| D. 81,894 | Shinn | Aug. 26, 1930 |
| 1,896,313 | Hubbell et al. | Feb. 7, 1933 |
| 2,181,666 | Molin | Nov. 28, 1939 |
| 2,228,644 | Sackas | Jan. 14, 1941 |
| 2,477,493 | Olson | July 26, 1949 |
| 2,500,973 | Ackerman | Mar. 21, 1950 |
| 2,521,982 | Kors | Sept. 12, 1950 |

FOREIGN PATENTS

| | | |
|---|---|---|
| 674,268 | Great Britain | June 18, 1952 |